(12) United States Patent
Song et al.

(10) Patent No.: US 8,711,832 B2
(45) Date of Patent: Apr. 29, 2014

(54) METHOD AND APPARATUS FOR SELECTIVE DECODING IN A WIRELESS COMMUNICATION SYSTEM

(75) Inventors: Tae-Ik Song, Suwon-si (KR); Jong-Han Lim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 828 days.

(21) Appl. No.: 12/162,449

(22) PCT Filed: Jan. 25, 2007

(86) PCT No.: PCT/KR2007/000444
§ 371 (c)(1),
(2), (4) Date: Jul. 28, 2008

(87) PCT Pub. No.: WO2007/086696
PCT Pub. Date: Aug. 2, 2007

(65) Prior Publication Data
US 2009/0046697 A1    Feb. 19, 2009

(30) Foreign Application Priority Data
Jan. 27, 2008 (KR) .................. 10-2006-0009052

(51) Int. Cl.
*G08C 17/00* (2006.01)
*H04W 4/00* (2009.01)
*H04J 3/24* (2006.01)

(52) U.S. Cl.
USPC ............ 370/349; 370/311; 370/328; 370/329

(58) Field of Classification Search
None
See application file for complete search history.

(56) References Cited

U.S. PATENT DOCUMENTS

| | | | |
|---|---|---|---|
| 6,219,389 B1 | 4/2001 | Pappas et al. | |
| 6,891,812 B2 * | 5/2005 | Bender | 370/328 |
| 7,051,268 B1 * | 5/2006 | Sindhushayana et al. | 714/786 |
| 7,170,856 B1 * | 1/2007 | Ho et al. | 370/230 |
| 7,359,324 B1 * | 4/2008 | Ouellette et al. | 370/230 |
| 2004/0151122 A1 * | 8/2004 | Lau et al. | 370/252 |

FOREIGN PATENT DOCUMENTS

JP  2004-228930  8/2004

\* cited by examiner

*Primary Examiner* — Faruk Hamza
*Assistant Examiner* — Diane Lo
(74) *Attorney, Agent, or Firm* — The Farrell Law Firm, P.C.

(57) ABSTRACT

An apparatus and method for controlling decoding in a wireless communication system are provided. Data is received in a slot associated with a packet to be received. A threshold is determined according to format information of the packet. It is determined whether to decode the received data by comparing the threshold with the number of slots received in relation to the packet. The received data is stored without decoding, if the number of the received slots is less than or equal to the threshold. The received data is decoded to recover the packet, if the number of the received slots is greater than the threshold.

12 Claims, 5 Drawing Sheets

METHOD AND APPARATUS FOR SELECTIVE DECODING IN A WIRELESS COMMUNICATION SYSTEM

PRIORITY

This application claims priority under 35 U.S.C. §119(a) to an application filed in the Korean Intellectual Property Office on Jan. 27, 2006, and assigned Serial No. 2006-0009052, and under 35 U.S.C. §365(c) to PCT application PCT/KR2007/000444 filed on Jan. 25, 2007, the contents of which are incorporated herein by reference.

BACKGROUND OF THE INVENTION

1. Field of the Invention

The present invention relates generally to decoding in a wireless communication system, and more particularly, to a method and apparatus for controlling decoding in a Modulator-Demodulator (MODEM) chip.

2. Description of the Related Art

The most prevalent technologies for providing data service to users in today's wireless communication environment are $2.5^{th}$ Generation (2.5G) or $3^{rd}$ Generation (3G) cellular mobile communication technologies and Wireless Local Area Network (WLAN) technologies. The 2.5G or 3G cellular mobile communication technologies include Code Division Multiple Access 2000 1xEvolution Data Only (CDMA2000 1xEVDO), General Packet Radio Services (GPRS), and Universal Mobile Telecommunication Service (UMTS), and the WLAN technologies include Institute of Electrical and Electronics Engineers (IEEE) 802.11 WLAN.

The most prominent feature of the 3.5G cellular mobile communication technologies is that packet data service is provided to users so that they can access the Internet in a wide wireless communication environment. These wireless communication systems provide High Rate Packet Data (HRPD). A system supporting HRPD (an HRPD system) sends one coded packet over a plurality of slots. The number of slots that one packet occupies is defined as a slot size or a span.

In a wireless communication system, for example, the HRPD system, when a receiver has received data in as many slots as a span set in system, it ends decoding for error correction of received data. This is called "Normal Termination". The Normal Termination is made irrespective of the decoding result of the received data. On the other hand, the receiver can end decoding according to the decoding result even before completely receiving data in as many slots as the span. For example, when the decoding result is "good", the receiver ends the decoding without further receiving the data of the remaining slots. This is called "Early Termination".

FIG. 1 is a flowchart illustrating a decoding procedure in a typical wireless communication system. By way of example, a Mobile Equipment (ME) receives data from a Base Station (BS) and performs the decoding procedure in the illustrated case of FIG. 1.

Referring to FIG. 1, the ME receives data in a slot associated with a packet in step 101 and recovers the packet by decoding the received data in step 103. If the ME received data in at least one previous slot associated with the packet, it combines the data of all the previous slots received in relation to the packet before the decoding. In step 105, the ME compares the number of slots received so far (received slots) with the span of the packet. If the span is less than the number of the received slots, the ME normally terminates the decoding of the packet in step 107.

On the contrary, if the span is equal to or greater than the number of the received slots, the ME determines whether the decoding result is "good" or "bad" in step 111. If the decoding result is bad, the ME returns to step 101 to receive data in the next slot associated with the packet. If the decoding result is good, the ME early terminates the decoding of the packet in step 113.

In the HRPD system, as described above, for the case of early termination of decoding, a decoder, for example a turbo decoder of the ME such as an Access Terminal (AT), decodes received data in every slot and determines whether the decoding result is good or bad.

Given a packet format specifying a span of 16 slots, the turbo decoder decodes even when data is received in the first slot. Also, even when all of the 16 slots should be received, i.e. in the case of normal termination, the turbo decoder decodes data in every slot.

In the case of early termination of decoding, the turbo decoder decodes received data in every slot irrespective of the packet format of the data. This unnecessary decoding consumes the power of a MODEM chip. For its operation, the turbo decoder occupies a relatively high 10% of the total power consumption of the MODEM chip and the conventional HRPD system dissipates about 9.4% of the total power consumption of the MODEM chip for the unnecessary decoding.

SUMMARY OF THE INVENTION

The present invention has been made to address at least the above problems and/or disadvantages and to provide at least the advantages described below.

Accordingly, an aspect of the present invention provides a method and apparatus for efficiently controlling decoding in a wireless communication system.

Another aspect of the present invention provides a method and apparatus for controlling decoding to efficiently save power of a MODEM chip in a wireless communication system.

A further aspect of the present invention provides a method and apparatus for controlling decoding according to the format information of a packet to be received.

An additional aspect of the present invention provides a method and apparatus for controlling selective decoding according to the format information of a packet to be received, the number of slots received in relation to the packet, and a received Signal-to-Noise Ratio (SNR).

According to one aspect of the present invention, a method is provided for controlling decoding in a wireless communication system. Data is received in a slot associated with a packet to be received. A threshold is determined according to format information of the packet. It is determined whether to decode the received data by comparing the threshold with the number of slots received in relation to the packet. The received data is stored without decoding, if the number of the received slots is less than or equal to the threshold. The received data is decoded to recover the packet, if the number of the received slots is greater than the threshold.

According to another aspect of the present invention, an apparatus is provided for controlling decoding in a wireless communication system. A threshold decider determines a threshold according to format information of a packet to be received, upon receipt of data in a slot associated with the packet. A control signal generator determines whether to decode the received data by comparing the threshold with the number of slots received in relation to the packet, and generates a control signal according to a result of the determination.

A decoder stores the received data without decoding, if the number of the received slots is less than or equal to the threshold, and decodes the received data to recover the packet, if the number of the received slots is greater than the threshold.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
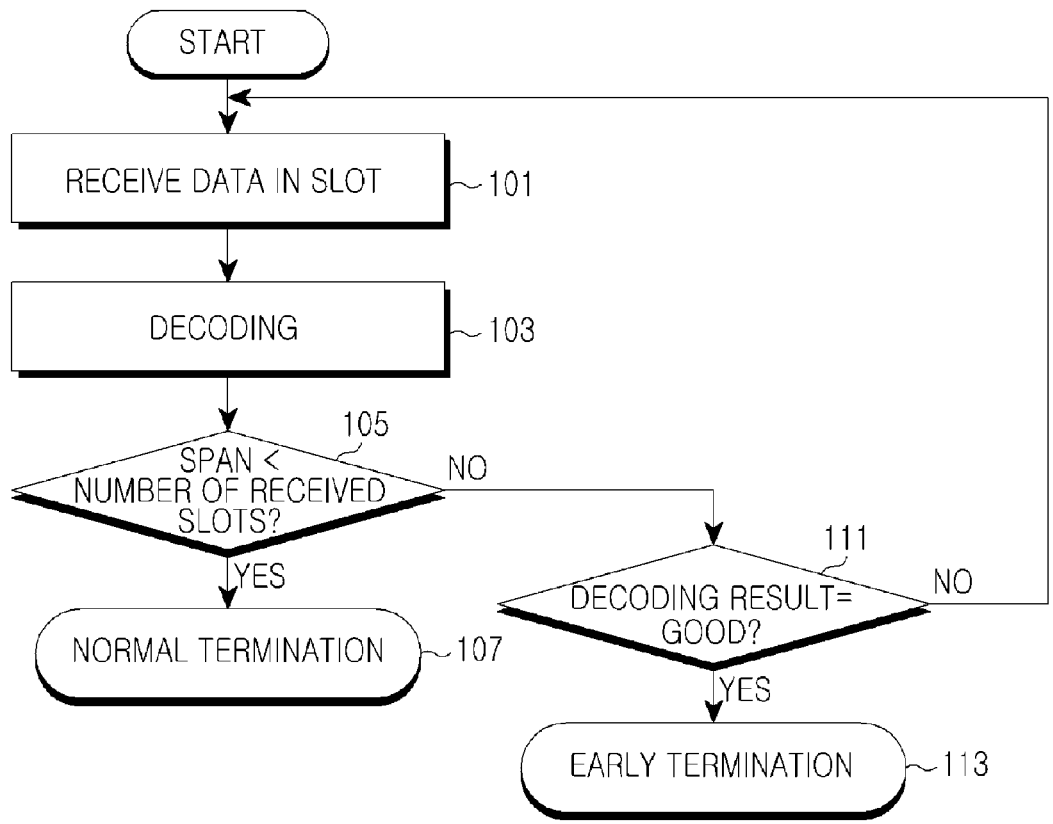
FIG. 1 is a flowchart illustrating a decoding procedure in a typical wireless communication system.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

Preferred embodiments of the present invention are intended to control the operation of a decoder in a MODEM chip of a receiver, for decoding of data encoded by a channel encoder of a transmitter in a wireless communication system. More specifically, the present invention controls decoding, taking into account the format information (i.e. packet format) of a packet to be received, the number of received slots in relation to the packet, and a received SNR, so as to reduce the power consumption of decoding in the MODEM chip.

The HRPD system encodes a packet to a plurality of encoded symbols and sends them over a plurality of slots. A decoder, for example, a turbo decoder, can recover the original packet from part of the encoded symbols. If the turbo decoder succeeds in a recovery of the packet before completely receiving data in all of the slots, it early terminates the decoding of the packet.

In cases of early termination of decoding, the decoder typically recovers a packet by decoding data received in every slot and determines whether the decoding result is good or bad by a Cyclic Redundancy Check (CRC) on the recovered packet.

In contrast, in accordance with an embodiment of the present invention, the decoder is operated only when a predetermined condition is fulfilled rather than in every received slot, to thereby minimize the power consumption of the MODEM chip. A decision as to whether to activate or deactivate the decoder should be made so far as decoding performance is not degraded.

Figure 2:
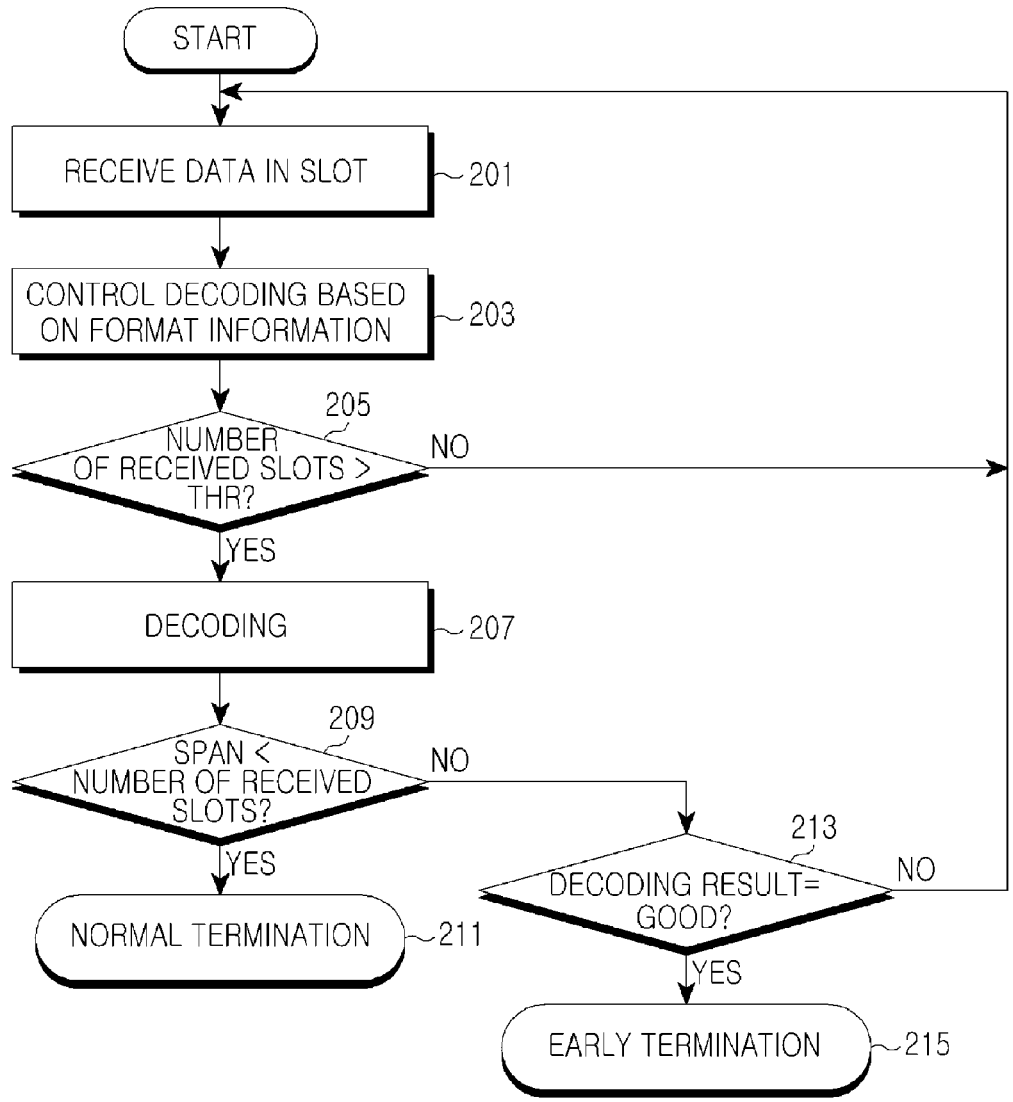
FIG. 2 is a flowchart illustrating a decoding controlling procedure according to an embodiment of the present invention.

FIG. 2 is a flowchart illustrating a decoding controlling procedure according to an embodiment of the present invention. While the decoding controlling procedure takes place at an ME that receives data from a BS and decodes the data, it is one of many possible applications. Therefore, it is to be clearly understood that the opposite case is also possible.

Referring to FIG. 2, the ME receives data in a slot associated with a packet in step 201 and sets decoding parameters according to information regarding the packet, for example, format information of the packet, in step 203. The format information specifies the coding rate, span (i.e. slot size) of the packet, etc.

In step 205, the ME compares the number of slots received in relation to the packet with a threshold (THR). The threshold is determined, taking into account at least one of the span and a received SNR. As stated before, the span is the total number of slots that the packet occupies. Hence, it follows that the threshold is less than the span. The received SNR is measured for a radio signal received at a current time.

If the number of the received slots is less than or equal to the threshold, the ME stores the received data without decoding and returns to step 201, considering that it has not received enough data to recover the packet.

If the number of the received slots exceeds the threshold, the ME recovers the packet by decoding the received data in step 207. The ME combines the data of total received slots associated with the packet before decoding.

In step 209, the ME compares the span of the packet with the number of received slots. If the span is less than the number of received slots, the ME normally terminates the decoding of the packet in step 211. Then, the packet is output together with the decoding result of the packet.

If the span is greater than or equal to the number of the received slots, the ME determines whether the decoding result is "good" or "bad" in step 213. If the decoding result is bad, the ME returns to step 201 in which it stores the received data and receives data in the next slot associated with the packet. If the decoding result is good, the ME early terminates the decoding of the packet and outputs the packet in step 215.

As described above, a decision as to whether to activate or deactivate the decoder is made in every slot in the embodiment of the present invention. The decision depends on format information of a packet to be received, the number of slots received in relation to the packet, and a current and/or previous received SNR measurement.

Figure 3:
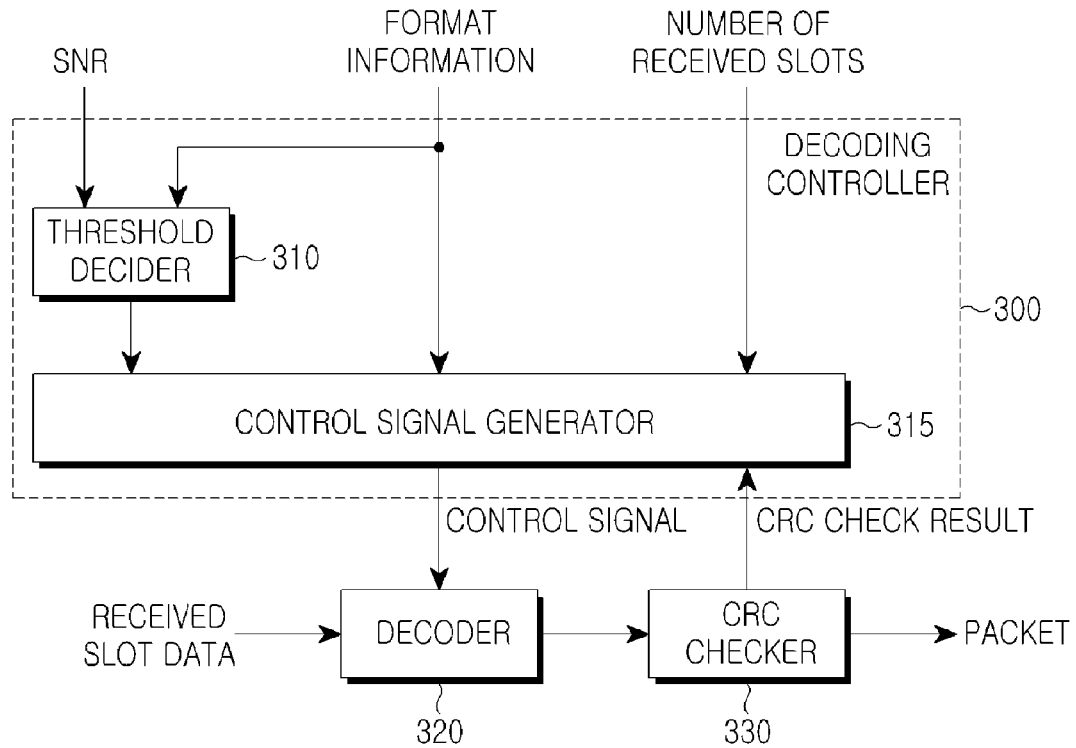
FIG. 3 is a block diagram of a decoding controller according to an embodiment of the present invention.

FIG. 3 is a block diagram of the decoding controller according to an embodiment of the present invention.

Referring to FIG. 3, a decoding controller 300 includes a threshold decider 310 and a control signal generator 315, for controlling activation or deactivation of a decoder 320.

The threshold decider 310 determines the threshold (THR) to be compared with the number of received slots based on at least one of format information of a packet to be received and a received SNR. For example, the threshold decider 310 preserves a table, in which all possible spans that the format information can specify are mapped to empirical thresholds, and selects a threshold corresponding to a span indicated by the format information of the packet from the table. In another example, the threshold decider 310 determines a final threshold by adjusting the selected threshold at a predetermined rate or by a predetermined value according to a received SNR, measured at a current time, or a variation in the received SNR of the current time relative to a received SNR of a previous time. While not described herein, a different algorithm for determining the threshold using at least one of the span and the received SNR can be used as another embodiment of the present invention.

Upon receipt of the threshold from the threshold decider 310, the control signal generator 315 compares the threshold with the number of received slots and outputs a control signal for controlling decoding in the manner illustrated in FIG. 2. The control signal is set to "ON" for one slot duration when the number of the received slots exceeds the threshold, and to "OFF" for one slot duration when the number of the received slots is less than or equal to the threshold.

The decoder 320 receives one slot data in each slot, combines the slot data with previous slot data, and determines whether to recover the packet by decoding the combined data according to the control signal provided from the decoding controller 300. If the control signal is OFF and there remain non-received slot data associated with the packet, the combined data is stored to be combined with data of the next slot. When the decoder 320 recovers the packet by decoding the combined data, a CRC checker 330 checks whether the decoding is successful or has failed by a CRC check of the packet, and provides a CRC check result as the decoding result to the control signal generator 315. If the decoding result is bad, the control signal generator 315 awaits the decoding result of the next slot of the packet, and if the decoding result is good, it awaits the decoding result of a new packet.

Examples of the above-described decoding control operation according to the embodiment of the present invention are further described.

In the HRPD system, format information of a packet is indicated by a Data Rate Control (DRC) value. The ME measures the SNR of a radio signal received from the BS, determines a DRC value based on the SNR, and reports the DRC value to the BS. The BS then sends a packet to the ME using packet format according to the DRC value. The DRC value indicates a combination of a packet span and other format information of the packet.

Case 1: The threshold is determined based on the packet span.

For a packet with a DRC value of 1, the DRC value of 1 indicates a span of 16 slots and corresponds to a threshold of 10. The decoding controller 300 sets the control signal for controlling decoding to OFF until the number of received slots reaches 10. Correspondingly, data received in each of the slots is combined and stored without decoding. If the number of received slots exceeds 10, the decoding controller 300 sets the control signal to ON and controls the operation of the decoder according to format information specified by the DRC value. Thus, the decoder 320 recovers the packet by decoding data received up to the current slot.

As described above, thresholds are preset with respect to DRC values and the decoding controller uses one of the thresholds in accordance with format information of the packet.

Case 2: The threshold is determined, taking into account the packet span and the received SNR.

A channel environment may vary between the time of deciding a DRC value and the time of receiving a packet from the BS according to the DRC value. For instance, if the DRC value is determined to be 13 based on an SNR measured under a good channel environment, the BS sends a packet according to format information corresponding to the DRC value 13. However, if the channel environment becomes poor when the ME is to receive the packet, the ME may not receive the packet normally.

The DRC value of 13 indicates a span of two slots. In a poor channel environment, i.e. in the case of a very low received SNR, there is a very low probability that decoding is successful only with data received in a first slot. Therefore, deactivating the decoder at the time of receiving the first slot is efficient in terms of power consumption. Yet, when data is received in a second slot, i.e. data has been received in the entire slots indicated by the span, the decoder 320 should be activated. Hence, the decoding controller 300 determines a final threshold by adjusting a threshold corresponding to the span at a predetermined rate or by a predetermined value according to a received SNR measured at a current time. As described above, the threshold is compared with the number of received slots, for use in determining whether to activate or deactivate the decoder 320. In another embodiment of the present invention, the decoding controller 300 determines a threshold by reducing the span at a predetermined rate or by a predetermined value according to the current received SNR measurement.

Thresholds versus packet spans or received SNRs are predefined considering simulation results regarding the distribution of numbers of received slots of which decoding is successful. A description is provided regarding distribution for spans of two or more slots in the HRPD system.

FIGS. 4 to 8 are distribution graphs illustrating numbers of received slots of which the decoding is successful in the HRPD system. The simulation was under the conditions of Additive White Gaussian Noise (AWGN) and SNRs satisfying a Packet Error Rate (PER) of 1%.

Figure 4:
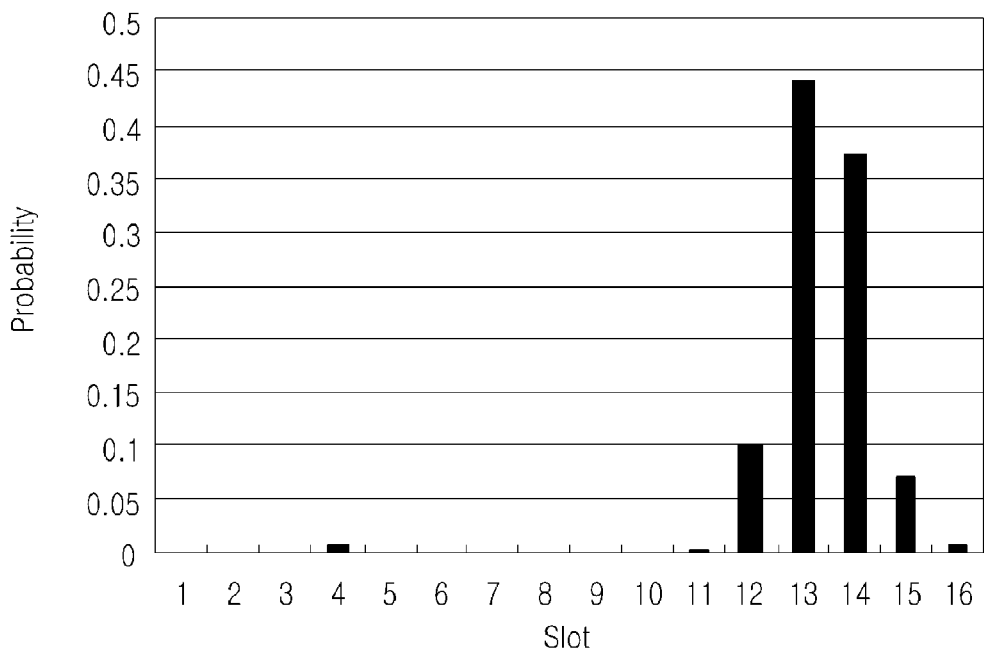
FIGS. 4 to 8 are distribution graphs illustrating numbers of received slots of which the decoding is successful in an HRPD system.

FIG. 4 is a distribution graph illustrating decoding success probabilities for a DRC value of 1 indicating a span of 16 slots. Referring to FIG. 4, decoding is successful after data is received in more than 11 slots. That is, if the number of received slots is 11 or less, decoding is unnecessary, and only consumes power of a MODEM chip. Accordingly, a threshold of 11 is preferable for the DRC value of 1.

Figure 5:
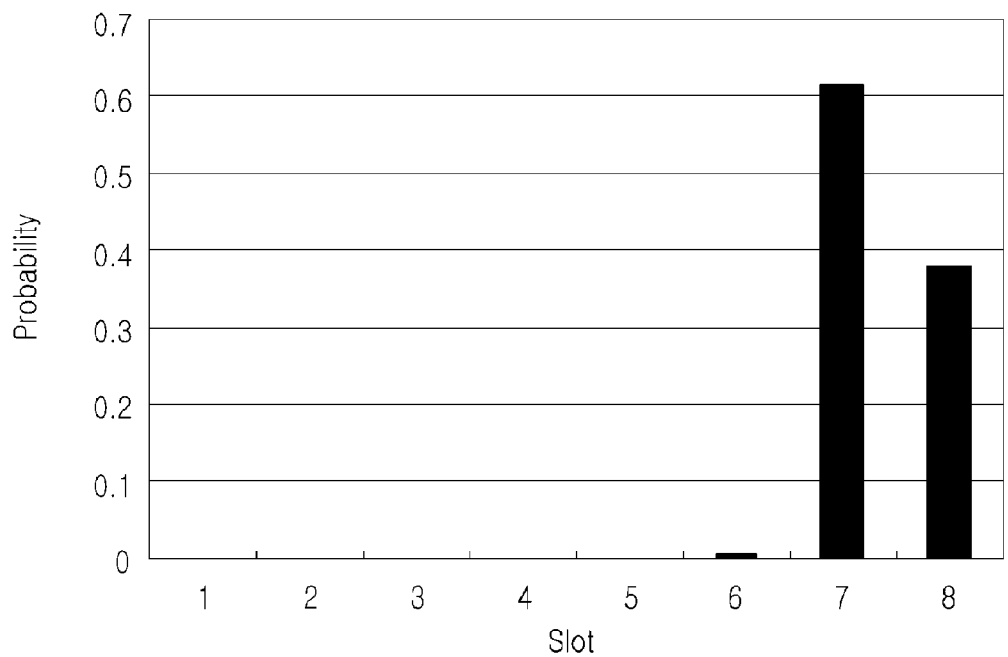

FIG. 5 is a distribution graph illustrating decoding success probabilities for a DRC value of 2 indicating a span of 8 slots. As noted from FIG. 5, decoding is successful after data is received in 7 slots and more. That is, if the number of received slots is less than 7, decoding is unnecessary, and only consumes power of the MODEM chip. Accordingly, a threshold of 6 is preferable for the DRC value of 2.

Figure 6:
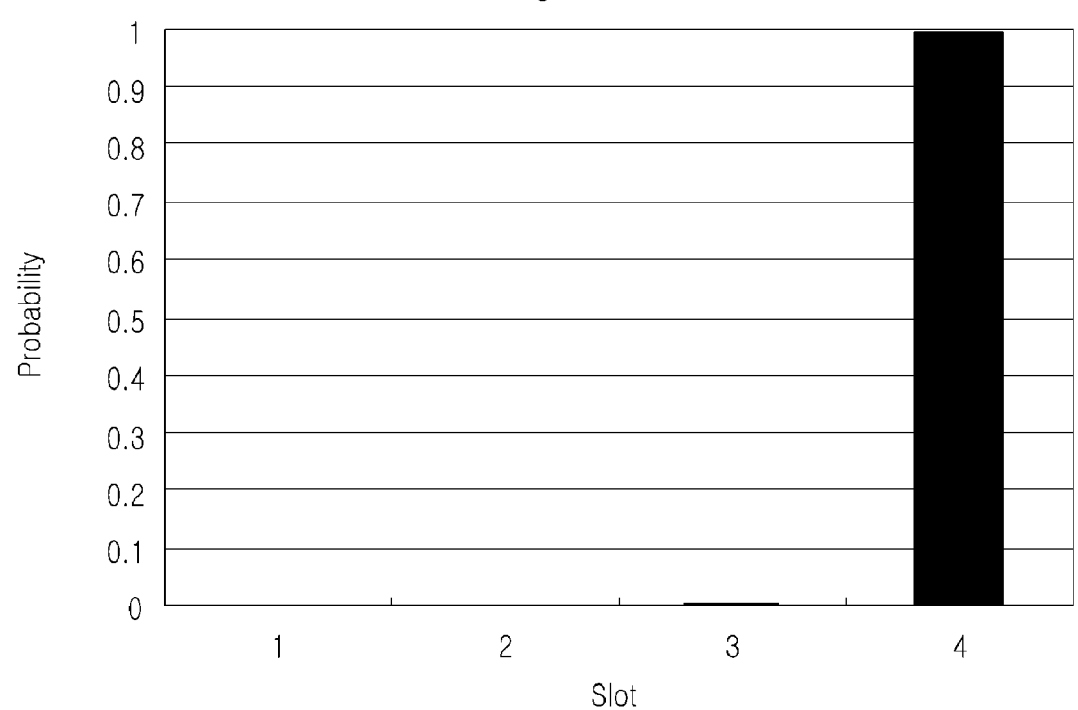
Figure 7:
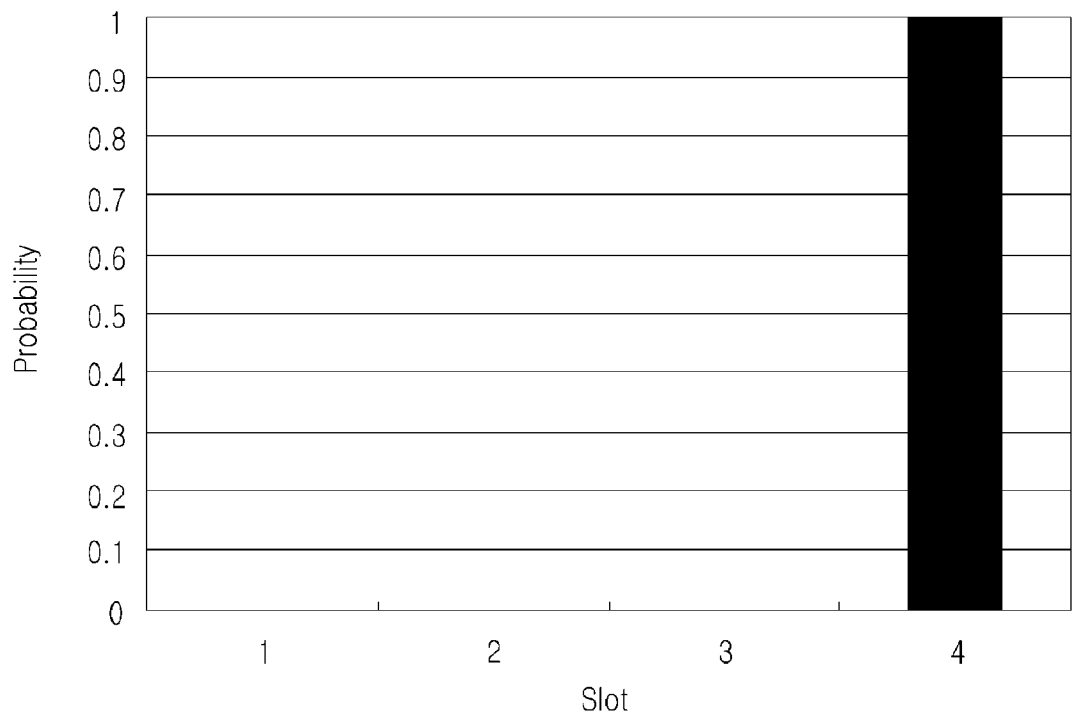

FIGS. 6 and 7 are distribution graphs illustrating decoding success probabilities for DRC values of 3 and 5 both indicating a span of 4 slots. The DRC values of 3 and 5 specify different format information for the same span. As noted from FIGS. 6 and 7, decoding is successful after data is received in all of 4 slots. That is, if the number of received slots is less than 4, decoding is unnecessary, and consumes power of the MODEM chip. Accordingly, a threshold of 3 is preferable for the DRC values of 3 and 5.

Figure 8:
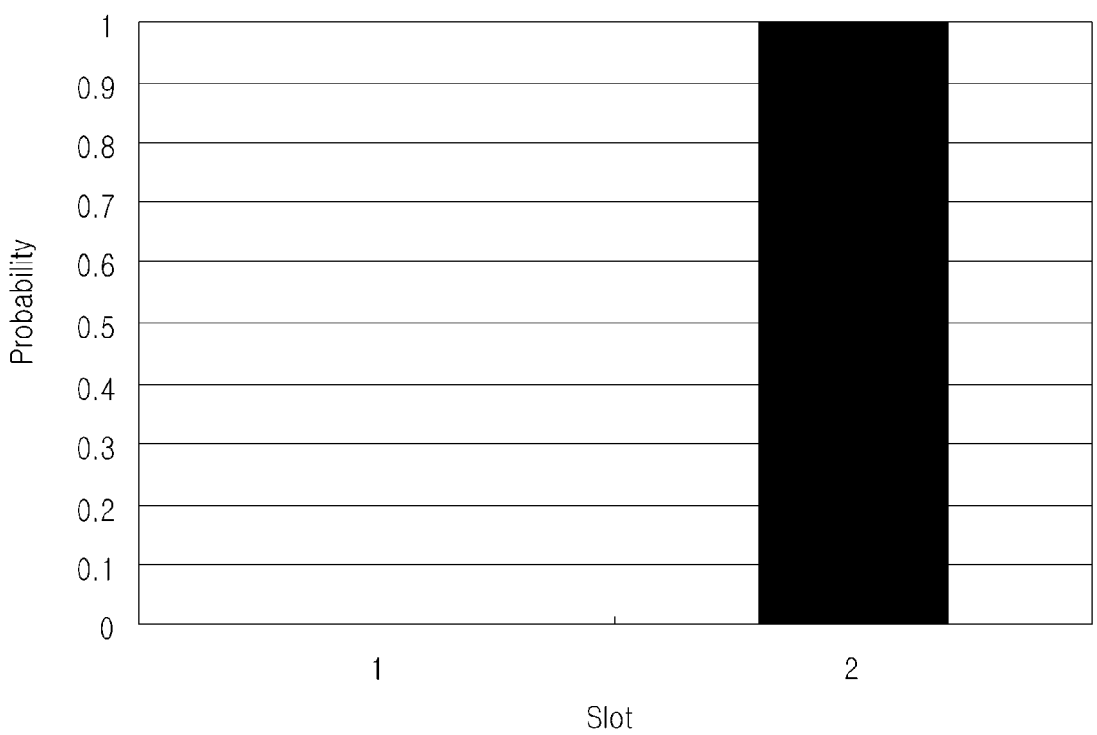

FIG. 8 is a distribution graph illustrating decoding success probabilities for DRC values of 4, 7, 8, 10 and 13 indicating a span of two slots. As noted from FIG. 8, decoding is successful after data is received in two slots. That is, if the number of received slots is less than 2, decoding is unnecessary, and consumes power of the MODEM chip. Accordingly, a threshold of 1 is preferable for the DRC values of 4, 7, 8, 10 and 13.

As is apparent from the above description, the decoder does not need to operate until the number of received slots reaches a specific value in the AWGN environment. For instance, even reduction of the operation time of the decoder to a half during receiving a packet with a DRC value of 7 does not affect decoding performance. Nevertheless, assuming that the decoder occupies 10% of the total power consumption of the MODEM chip, the total power consumption of the MODEM chip is decreased by 5%.

Under an environment other than the AWGN environment, for example, under a fading environment, the Probability Density Function (PDF) of decoding success is given as follows with respect to DRC values and numbers of received slots, assuming that the MS moves at 100 Km/h in a 3-path channel environment.

TABLE 1

| DRC value | Number of received slots | PDF of decoding success |
|---|---|---|
| 5 | 1 | 0.045 |
|   | 2 | 0.935 |
|   | 3 | 0.020 |
|   | 4 | 0.000 |
| 7 | 1 | 0.079 |
|   | 2 | 0.921 |
| 8 | 1 | 0.000 |
|   | 2 | 1.000 |
| 10 | 1 | 0.000 |
|   | 2 | 1.000 |
| 13 | 1 | 0.000 |
|   | 2 | 1.000 |

In Table 1, for a DRC value of 5, the decoding success probability for data received in a first slot is very low, and thus the decoder is deactivated for the first slot. Since the PDF is highest for two received slots, it is preferable to activate the decoder starting from a second slot. For a DRC value of 7, the decoder operates in every slot. For DRC values of 8, 10 and 13, the decoder is deactivated in a first slot.

While decoding is controlled taking into account a packet format specified by a DRC value and the number of received slots in the above examples, the decoding control can be more efficient by additionally considering a received SNR. Hence, in a modified embodiment of the present invention, the decoding controller 300 compares a received SNR measured at a previous time corresponding to the DRC value of a packet to be received, with a received SNR measured at a current time when the packet is received. If the current received SNR is greater than the previous received SNR, the decoding controller 300 sets the control signal to ON, thus activating the decoder 320 for data received in a current slot.

In another modified embodiment of the present invention, if the number of received slots so far is greater than a threshold corresponding to the DRC value of a packet, and a received SNR at a previous time corresponding to the DRC value is greater than a received SNR at a current time, the decoding controller 300 sets the control signal to ON, thus activating the decoder 320 for data received in a current slot.

As described above, activation or deactivation of the decoder is decided according to the control signal from the decoding controller in the ME. The decoding controller makes the determination based on format information of a packet to be received, a received SNR, and the number of received slots in relation to the packet. Specifically, the decoding controller determines whether to activate or deactivate the decoder for the current slot by comparing the number of received slots with a threshold according to the format information and/or the received SNR.

The decoding control in the wireless communication system according to the embodiments of the present invention minimizes the power consumption of the decoder without degrading decoding performance and efficiently saves power for the MODEM chip. Considering a high ratio of the power consumption of the decoder relative to the total power consumption of the MODEM chip, the decrease of the power consumption of the decoder lengthens the battery lifetime of the ME. As a consequence, a variety of services can be provided, making it possible to produce competitive MEs.

While the invention has been shown and described with reference to certain preferred embodiments thereof, it will be understood by those skilled in the art that various changes in form and details may be made therein without departing from the spirit and scope of the present invention as defined by the appended claims.

The invention claimed is:

1. A method for controlling decoding to save power of a modem chip in a wireless communication system, comprising the steps of:
    measuring a Signal-to-Noise Ratio (SNR) of a radio signal received from a base station at a current time;
    determining format information of a packet to be received based on a total number of slots occupied by the packet to be received;
    determining, according to at least one of the format information and the measured SNR, a threshold number of slots of the packet to be received before decoding the packet, the threshold being less than the total number of slots occupied by the packet;
    determining whether to decode a received data associated with the packet by comparing the threshold with a number of received slots of the packet;
    storing the received data without decoding when the number of received slots is determined to be less than or equal to the threshold; and
    decoding the received data to recover the packet when the number of received slots is determined to be greater than the threshold.

2. The method of claim 1, wherein the format information of the packet comprises the number of slots occupied by the packet, indicated by a Data Rate Control (DRC) value applied to the packet.

3. The method of claim 1, wherein the threshold determination comprises:
    obtaining the number of slots occupied by the packet according to the format information of the packet; and
    selecting a threshold corresponding to the number of slots occupied by the packet, referring to a table listing thresholds with respect to numbers of slots.

4. The method of claim 1, wherein the threshold determination comprises:
    obtaining the number of slots occupied by the packet according to the format information of the packet;
    selecting a first threshold corresponding to the number of slots occupied by the packet, referring to a table listing thresholds with respect to all possible numbers of slots; and
    adjusting the first threshold according to the SNR and determining the adjusted threshold as the threshold.

5. The method of claim 1, wherein the determination of whether to decode the received data comprises:
    comparing an SNR at a previous time corresponding to a DRC value applied to the packet with the SNR at the current time;
    determining not to decode the received data, if the number of received slots is less than or equal to the threshold, or if the current received SNR is less than or equal to the SNR at the previous time; and
    determining to decode the received data, if the number of received slots is greater than the threshold and the SNR at the current time is greater than the SNR at the previous time.

6. The method of claim 5, wherein the DRC value is determined according to the SNR at the previous time.

7. An apparatus for controlling decoding to save power of a modem chip in a wireless communication system, comprising:
    a threshold decider for measuring a Signal-to-Noise Ratio (SNR) of a radio signal received from a base station at a current time, determining format information of a packet to be received based on a total number of slots occupied by the packet, and determining, according to at least one of the format information and the SNR, a threshold number of slots of the packet to be received before decoding the packet, the threshold being less than the total number of slots occupied by the packet;

a control signal generator for determining whether to decode a received data by comparing the threshold with a number of received slots of the packet and generating a control signal according to a result of the determination; and a decoder for storing the received data without decoding, when the number of received slots is determined to be less than or equal to the threshold, and decoding the received data to recover the packet, when the number of received slots is determined to be greater than the threshold.

8. The apparatus of claim 7, wherein the format information of the packet comprises the number of slots occupied by the packet, indicated by a Data Rate Control (DRC) value applied to the packet.

9. The apparatus of claim 7, wherein the threshold decider obtains the number of slots occupied by the packet according to the format information of the packet, and selects a threshold corresponding to the number of slots occupied by the packet, referring to a table listing thresholds with respect to numbers of slots.

10. The apparatus of claim 7, wherein the threshold decider obtains the number of slots occupied by the packet according to the format information of the packet, selects a first threshold corresponding to the number of slots occupied by the packet referring to a table listing thresholds with respect to all possible numbers of slots, adjusts the first threshold according to the SNR, and determines the adjusted threshold as the threshold.

11. The apparatus of claim 7, wherein the control signal generator compares an SNR at a previous time corresponding to a DRC value applied to the packet with the SNR at the current time, determines not to decode the received data, if the number of received slots is less than or equal to the threshold, or if the current received SNR is less than or equal to the SNR at the previous time, and determines to decode the received data, if the number of received slots is greater than the threshold and the SNR at the current time is greater than the SNR at the previous time.

12. The apparatus of claim 11, wherein the DRC value is determined according to the SNR at the previous time.

* * * * *